United States Patent [19]
Green

[11] 3,886,490
[45] May 27, 1975

[54] APPARATUS FOR COUPLING AN ARRAY OF ULTRASONIC TRANSDUCERS TO AN ULTRASONIC COMPRESSIONAL IMAGE FIELD AND SCANNING THE IMAGE FIELD

[75] Inventor: Philip S. Green, Redwood City, Calif.

[73] Assignee: Stanford Research Institute, Menlo Park, Calif.

[22] Filed: May 25, 1973

[21] Appl. No.: 363,876

[52] U.S. Cl. .............................. 340/5 MP; 340/8 R
[51] Int. Cl. ............................................. H04b 11/00
[58] Field of Search.......... 340/5 H, 5 MP, 8 S, 8 L, 340/8 R, 8 D, 10, 8 MM; 181/0.5 A, 0.5 R

[56] References Cited
UNITED STATES PATENTS

| | | | |
|---|---|---|---|
| 3,409,869 | 11/1968 | McCool et al. | 340/8 MM |
| 3,548,642 | 12/1970 | Flaherty et al. | 340/5 MP |

*Primary Examiner*—Richard A. Farley
*Attorney, Agent, or Firm*—Urban H. Faubion

[57] ABSTRACT

A compressional acoustic image field propagating in a fluid filled container is converted to electrical impulses which in turn provide a means for converting the incident compressional image field to a visual representation by locating a linear array of piezoelectric elements in intimate coupling contact with a thin, acoustically transparent window upon which the acoustic image field impinges. Coupling between the acoustic image field and the array of transducers is improved by providing a thin layer of coupling liquid on the outside of the window (the side in contact with the transducer array). The linear array effectively sweeps the entire compressional acoustic image field of interest mechanically moving the entire array back and forth (in a direction orthogonal to the linear array) across the window.

7 Claims, 3 Drawing Figures

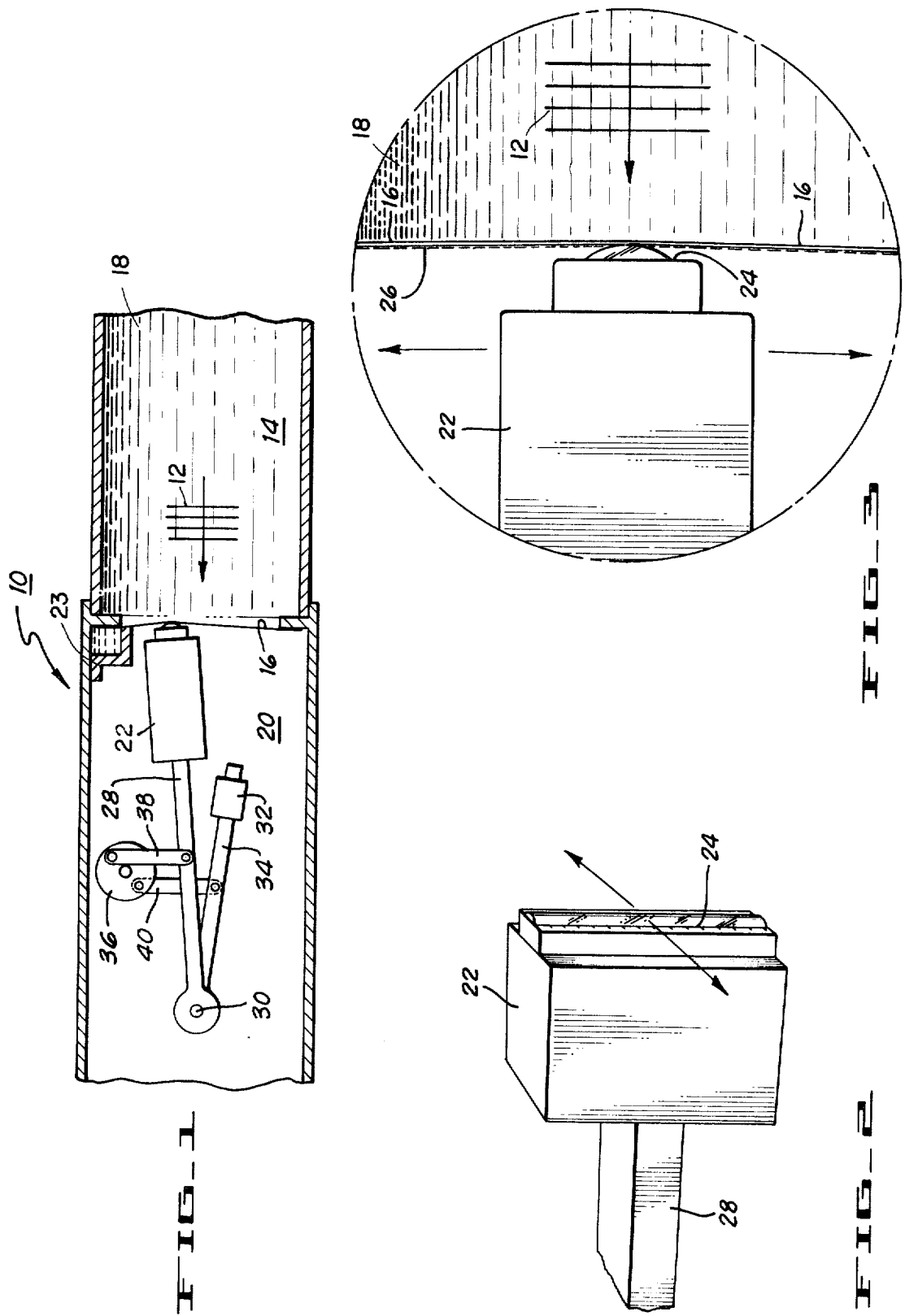

APPARATUS FOR COUPLING AN ARRAY OF ULTRASONIC TRANSDUCERS TO AN ULTRASONIC COMPRESSIONAL IMAGE FIELD AND SCANNING THE IMAGE FIELD

BACKGROUND OF INVENTION

Visualization of acoustic wavefields has been the subject of extensive investigation with the result that a wide variety of demonstrated methods exist for converting a pattern of compressional acoustic image fields in a fluid to a visible analog. A number of methods have been devised.

The ideal approach to real time visualization of acoustic wavefields appears to involve provision of an array or arrays of discrete piezoelectric receiving elements which are sequentially sampled in synchronization with a cathode ray tube display by electrical gate circuits. Ideally, the entire image plane would be filled by a rectangular matrix of 40,000 to 100,000 receiving elements. However, the problems of producing and attaching an equal number of electronic switches and amplifiers to these elements in a confined space in a practical configuration and at reasonable cost are still beyond the state of the art. A good compromise is achieved, however, by using a hybrid converter consisting of a line array of discrete piezoelectric elements electronically scanned at a high rate while the entire line is mechanically translated across the image plane or, alternatively, the acoustic image field is moved past the stationary array. A converter employing this general concept is described in an article by P. S. Green, J. L. S. Bellin and G. C. Knollman, entitled "Acoustic Imaging in a Turbid Underwater Environment," which appeared in the JOURNAL OF THE ACOUSTICAL SOCIETY OF AMERICA, vol. 44, no. 6, Dec. 1968, pp. 1719-1730 (see pp. 1726 and 1727).

SUMMARY AND OBJECTS OF INVENTION

The present invention provides a way to couple an ultrasonic transducer to a compressional acoustic image field propagating in a fluid medium, whereby the entire image field may be translated into electrical impulses which in turn are capable of being converted to a visual representation. The compressional acoustic image field propagated in the fluid medium impinges upon a thin, acoustically transparent window and the ultrasonic transducer array is positioned in intimate coupling contact with the outside surface of the window to receive the acoustic image field. Coupling between the acoustic image field and the array of transducers is improved by providing a thin layer of coupling liquid on the outside of the window by in contact with the transducer array. In the preferred embodiment the ultrasonic transducer array constitutes a linear array of piezoelectric elements for converting a line across the compressional image field to electrical impulses and the linear transducer array is mechanically translated back and forth in contact with the window so that the linear array effectively sweeps the entire compressional acoustic image field of interest. In one embodiment improved coupling is assured by applying the coupling liquid to the surface of the window in a continuous stream while the transducer array is mechanically moved back and forth across the window.

An object of the invention is to couple a compressional image field which is propagating in a fluid filled container to a transducer array outside the fluid filled container in a highly efficient manner.

Another object of the invention is to provide a means to convert a compressional image field to electrical impulses capable of being converted to a visual representation using a linear array of piezoelectric elements.

The novel features which are believed to be characteristic of the invention are set forth with particularity in the appended claims. The invention itself, however, both as to its organization and method of operation together with further objects and advantages thereof, may best be understood by reference to the following description taken in connection with the accompanying drawing.

BRIEF DESCRIPTION OF DRAWINGS

FIG. 1 is a central, vertical, longitudinal section taken through a partially broken-away camera body and shows somewhat diagrammatically the relative location of ultrasonic compressional wavefields, the translating transducer, the intervening window and a mechanical drive system for scanning the transducer assembly over the compressional wavefields;

FIG. 2 is an enlarged perspective view of the transducer assembly head illustrated in the embodiment of FIG. 1; and FIG. 3 is an enlarged sectional view of the immediate area of the transducer array which illustrates the incident compressional wavefield, the window and a portion of the transducer array.

DESCRIPTION OF PREFERRED EMBODIMENTS

A portion of the cylindrical camera body 10 containing the elements of a preferred embodiment is illustrated in the broken-away view of FIG. 1. The camera system receives and focuses a compressional wavefield from an insonified subject (not shown) and translates the ultrasonic compressional wavefield into electrical signals or impulses which are converted into a visual display of the insonified subject. The means of insonifying the subject as well as the means for receiving and focusing the ultrasonic compressional wavefields is not illustrated here since it does not constitute a part of the present invention. For example, the broken-away part of the camera body, at the right in FIG. 1, would include a focusing lens assembly such as the one described and claimed in the copending patent application entitled "Composite Acoustic Lens," Ser. No. 270,274, filed July 10, 1972, in the name of Philip S. Green and assigned to the assignee of the present invention. The subject matter of that application is specifically incorporated herein by reference.

The lens system produces an ultrasonic compressional wavefield 12 which is propagated through a liquid medium 18 in a fluid filled chamber 14 (to the right in the figure) in the camera body 10 toward a supporting, liquid-tight window 16 which is essentially transparent to incident ultrasonic waves. The focused ultrasonic compressional wavefield 12 is diagrammatically illustrated in FIGS. 1 and 3 by a series of parallel lines and an arrow which indicate that the ultrasonic compressional wavefield is propagated toward the liquid-tight window 16 in the fluid medium 18 of the fluid filled chamber 14. The supporting and acoustically transparent window 16 may be of any suitable material, such as a polyester membrane, which is rigidly (tautly) held across the full internal extent of the camera body 10 to separate the fluid filled chamber 16 (at the right) from the transducer containing chamber 20 (at the left), which in the preferred embodiment does not contain a fluid.

In order to translate the ultrasonic compressional wavefield 12 which is incident on the sonically transparent window 16, a box-like transducer head 22 is provided immediately behind the window in the transducer containing chamber 20. It is positioned with one end up against the side of the window opposite the impinging ultrasonic compressional wavefield. For a better understanding of the configuration of transducer head 22 and its parts and the relative location of the transducer head to the sonically transparent window 16 and the impinging ultrasonic compressional wavefield 12, reference should be had to FIGS. 2 and 3 along with FIG. 1. The elements which actually perform the translation from the compressional wavefield to electrical energy constitute a linear array of piezoelectric elements 24 which are held on the leading end (leading relative to the impinging sonic wavefield) of the transducer containing chamber 22 and hence against the sonically transparent window 16 in intimately coupled relationship to impinging sound waves. The linear array of piezoelectric elements 24 is not illustrated in great detail since such an array is illustrated and described in copending patent application for "Linear Transducer Array for Ultrasonic Image Conversion" by Philip S. Green, Ser. No. 291,002, filed Sept. 21, 1972, and assigned to the assignee of the present invention. The subject matter of that application is incorporated herein by reference. Any number of other linear arrays could be used. Further, a number of lines could be used (e.g., a two or three line array).

The important point is that the linear array 24 extends in a single line across one dimension of the entire ultrasonic compressional wavefield which is to be observed. It should be pointed out here that the linear arrays contemplated in the last mentioned copending Green application include shaping the linear array, e.g., in an arc, more closely to approximate the shape of the incident ultrasonic compressional waves and also the use of lens arrangements immediately between the piezoelectric transducer elements and incident wavefield, and either arrangement is considered to be in intimate coupling contact with the sonically transparent window 16.

In order to improve the coupling between the linear transducer array 24 and an ultrasonic compressional wavefield impinging on the sonically transparent window 16, it is useful to employ a film 26 of coupling material such as oil or gel on the surface of the sonically transparent window adjacent the linear array of transducer elements 24. In view of the fact that the linear array is given a mechanically scanning motion (as described later) along the surface of the sonically transparent window 16, it may be desirable to provide a source of coupling fluid which continuously supplies such fluid when the transducer head 22 is in motion, as by a coupling fluid holding container 23 positioned near the top of the window 16 that has a controlled leak along the window surface.

In order to translate the entire incident compressional acoustic image field, the single line transducer array is moved or swept back and forth (from top to bottom in FIGS. 1 and 3) so that a line at a time of the compressional image field is incident upon the linear transducer array, and thus the full compressional image field is exposed a line at a time. The electrical connections for the transducer array and the electrical circuits therefor are not illustrated in detail here since they are shown in the application "Linear Transducer Array for Ultrasonic Image Conversion," supra. Such connections are enclosed in the transducer head 22.

In order to provide for movement of the transducer array back and forth across the image field, the transducer head 22 is mounted on one end of a toggle arm 28 which is mounted at its opposite end for rotation on a shaft 30 fixed with respect to the camera body 10. Also fixed on the same shaft is a counterweight 32 and its associated counterweight toggle arm 34. The reason for using the counterweight 32 and the toggle arm arrangement is that the drive illustrated here utilizes a motor driven cam 36 between the transducer head 22 and its fixed shaft 30 to drive the transducer head back and forth across the ultrasonic compressional wavefield. In order to provide the drive linkage between the motor driven cam and the transducer head 22, a bar drive link 38 has one end connected to the center of the transducer toggle arm 28 and its opposite end connected eccentrically to the motor driven cam 36. Without the counterweight 32, this arrangement would put considerable unbalance and strain on the drive system. Therefore a similar linking bar 40 is connected to the center of the toggle arm 34 for the counterweight 32 and eccentrically to the motor driven cam 36 to counterbalance the transducer head. In other words, the eccentric points of connection for the link bars 38 and 40 driving the transducer head 22 and counterweight 32 are connected to diametrically opposed points on the motor drive cam 36 which are equidistant from the center of the cam.

The camera electronics and the means of synchronizing the sweeping transducer array with the sweep voltages for the visual display device that ultimately displays the visual analog of the ultrasonic compressional wavefield are not illustrated here because they form no part of this invention. The synchronizing sweep generator and its associated circuitry are described and claimed in U.S. Pat. No. 3,849,698, issued Nov. 19, 1974 application Ser. No. 354,237, filed Apr. 25, 1973, in the name of Hugh F. Frohbach entitled "Electromechanical Sweep Generating System with the Utilization of Photocells" and assigned to the assignee of the present invention. The subject matter of that application is specifically incorporated herein by reference.

While particular embodiments and structural arrangements are shown, it will be understood that the invention is not limited to these arrangements and structures since many modifications may be made in materials, arrangement of structural elements and arrangement of circuit elements. It is contemplated that appended claims will cover any such modifications which fall within the spirit and scope of the invention.

What is claimed is:

1. In a system for providing a visual representation of a compressional acoustic image field traveling in a fluid medium, an acoustically transparent window located in the path of said compressional acoustic image field and acting to contain said fluid, a transducer array located on the opposite side of said window from said fluid medium and in intimate contact with the said window, whereby the said compressional acoustic image field impinges upon said transducer array and is translated into electrical energy, and a thin layer of coupling liquid on the side of the said window contacted by the said transducer array.

2. A system as defined in claim 1, wherein the said thin layer of coupling liquid is applied to the surface of said window in a continuous stream while said transducer array is translating an incident compressional acoustic image field into electrical energy.

3. A system for providing a visual representation of a compressional acoustic image field traveling in a fluid medium, as defined in claim 1, wherein said transducer array comprises at least one linear array extending across the portion of the window impinged upon by the said compressional acoustic image field of interest.

4. A system as defined in claim 3, wherein the said layer of coupling liquid is applied to the surface of said window in a continuous stream.

5. A system for providing a visual representation of a compressional acoustic image field traveling in a fluid medium, an acoustically transparent window located in the path of said compressional acoustic image field and acting to contain said fluid, a transducer array located on the opposite side of said window from said fluid medium and in intimate contact with the said window, whereby the said compressional acoustic image field impinges upon said transducer array and is translated into electrical energy, and means for sweeping said linear transducer array back and forth along the surface of the said window in a direction substantially orthogonal to the longitudinal dimension of the array and over the full extent of the said compressional acoustic image field, whereby the said linear transducer array is exposed to the full compressional acoustic image field a line at a time.

6. A system as defined in claim 5 wherein a thin layer of coupling liquid is provided on the side of said window contacted by the said transducer array.

7. A system as defined in claim 6, wherein the said thin layer of coupling liquid is applied to the surface of said window in a continuous stream.

* * * * *